United States Patent
Lin

(10) Patent No.: US 9,201,594 B2
(45) Date of Patent: Dec. 1, 2015

(54) ELECTRONIC DEVICE AND METHOD FOR CONTROLLING VIRTUAL KEYBOARDS

(71) Applicant: Chiun Mai Communication Systems, Inc., New Taipei (TW)

(72) Inventor: Chin-Yu Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 125 days.

(21) Appl. No.: 14/140,458

(22) Filed: Dec. 24, 2013

(65) Prior Publication Data

US 2014/0189567 A1    Jul. 3, 2014

(30) Foreign Application Priority Data

Dec. 28, 2012 (TW) .............................. 101150771 A

(51) Int. Cl.
*G06F 3/048* (2013.01)
*G06F 3/0488* (2013.01)
*G06F 1/16* (2006.01)
*G06F 3/023* (2006.01)

(52) U.S. Cl.
CPC .......... *G06F 3/04886* (2013.01); *G06F 1/1694* (2013.01); *G06F 3/0238* (2013.01); *G06F 2200/1637* (2013.01)

(58) Field of Classification Search
CPC ................................................... G06F 3/04886
USPC ........................................................ 715/773
See application file for complete search history.

(56) References Cited

U.S. PATENT DOCUMENTS 8,954,877 B2 *   2/2015   Adams et al. .................. 715/773
2013/0286573 A1 *  10/2013   Adams et al. ............... 361/679.2

* cited by examiner

*Primary Examiner* — William Titcomb
(74) *Attorney, Agent, or Firm* — Novak Druce Connolly Bove + Quigg LLP

(57) ABSTRACT

In a method for controlling virtual keyboards using an electronic device, a first virtual keyboard, a second virtual keyboard, and a third virtual keyboard are preset, and the first virtual keyboard is preset to be a default virtual keyboard. When the electronic device enters a character input mode, the default virtual keyboard is invoked. A tilt direction and a tilt angle of the electronic device are detected. When the tilt direction is left and the tilt angle is greater than a predetermined angle, the default virtual keyboard is switched to the second virtual keyboard. When the tilt direction is right and the tilt angle is greater than the predetermined angle, the default virtual keyboard is switched to the third virtual keyboard.

18 Claims, 5 Drawing Sheets

ELECTRONIC DEVICE AND METHOD FOR CONTROLLING VIRTUAL KEYBOARDS

BACKGROUND

1. Technical Field

Embodiments of the present disclosure relate to character input management technology, and particularly to an electronic device and method for controlling virtual keyboards using the electronic device.

2. Description of Related Art

More electronic devices are having touch screens for data input/output. For example, a virtual keyboard is applied in an electronic device to help a user to input characters. However, keys on the virtual keyboard may be too small to be clicked because so many characters need to be arranged on the virtual keyboard, such as letters, numerals, and symbols. Accordingly, it is inefficient for the user to input characters by using the virtual keyboard. Therefore, an improved method for controlling virtual keyboards is desired.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
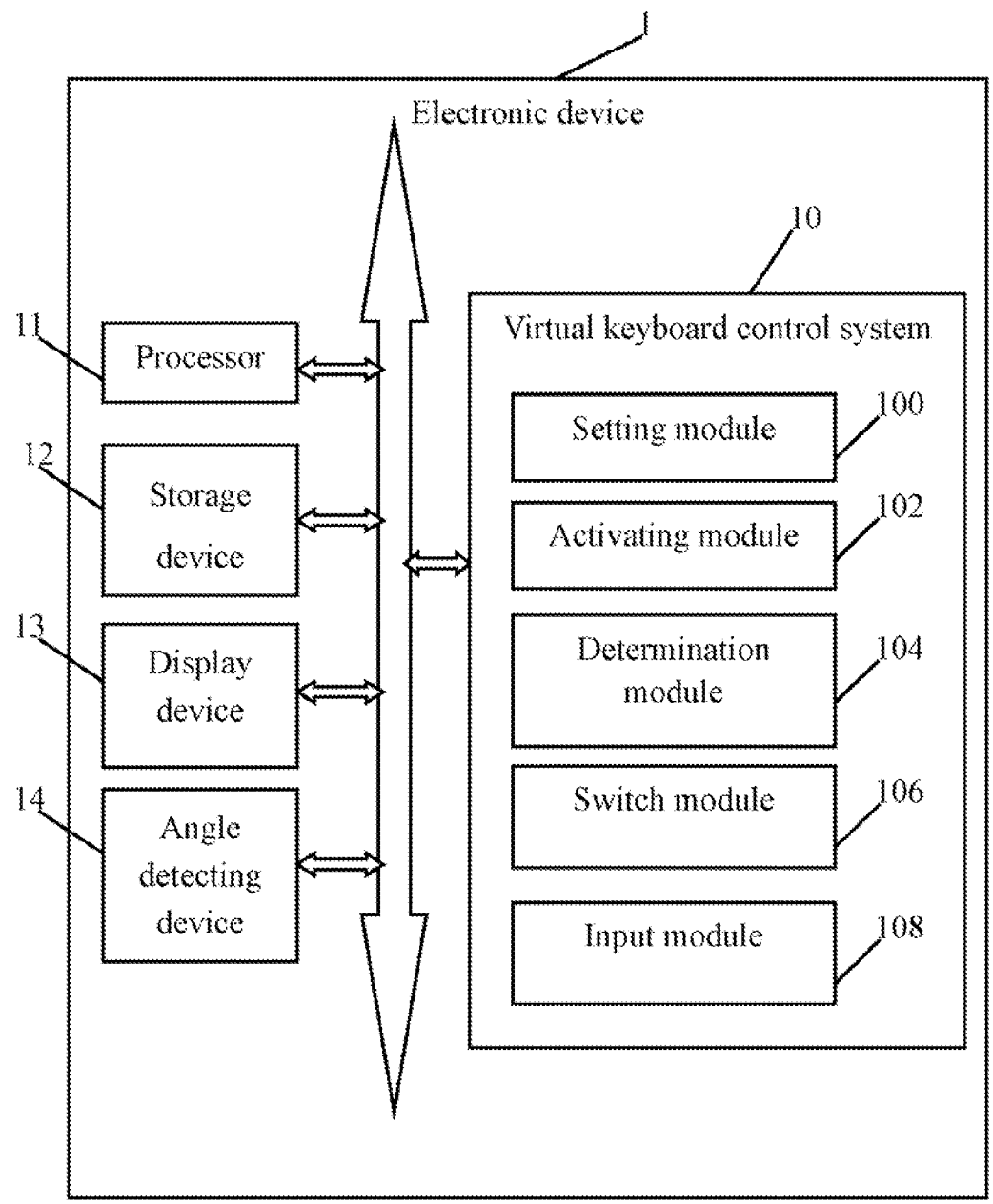
FIG. 1 is a block diagram of one embodiment of an electronic device including a virtual keyboard control system.

FIG. 1 is a block diagram of one embodiment of an electronic device 1 including a virtual keyboard control system 10. The electronic device 1 may be a mobile phone, a tablet computer, a personal digital assistant, a notebook computer, or other computing device. The electronic device 1 further includes at least one processor 11, a storage device 12, a display device 13, and an angle detecting device 14. FIG. 1 illustrates only one example of the electronic device 1 that may include more or fewer components than illustrated, or have a different configuration of the various components.

The at least one processor 11 is used to execute the virtual keyboard control system 10 and other applications, such as an operating system, installed in the electronic device 1. The storage devices 12 store one or more programs, such as the operating system and applications of the electronic device 1. The storage device 12 can be a storage card, such as a memory stick, a smart media card, a compact flash card, a secure digital card, or any other type of memory storage device.

The display device 13 displays visible data, such as videos, or images, for example. In some embodiments, the display device 13 may be a touch panel, such as a capacitive touch panel. The angle detecting device 14 can determine a tilt direction and measure a tilt angle of the electronic device 1. For example, the angle detecting device 14 may be a tilt sensor, a gravity sensor, or a gyroscope.

In some embodiments, the virtual keyboard control system 10 provides a plurality of virtual keyboards, and switches between the virtual keyboards when a predetermined condition is trigged.

In one embodiment, the virtual keyboard control system 10 may include one or more modules, for example, a setting module 100, an activating module 102, a determination module 104, a switch module 106, and an input module 108. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 5:
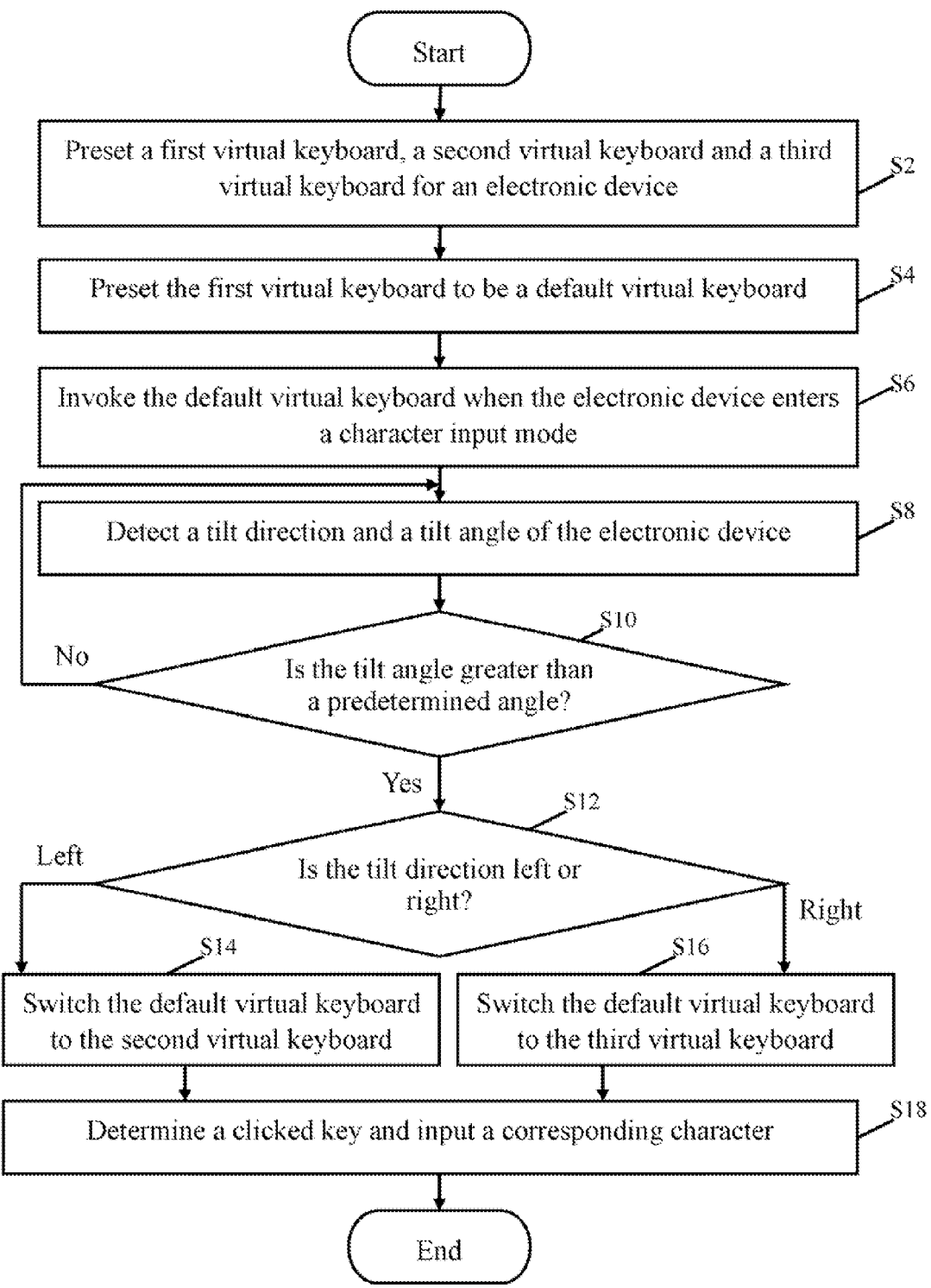
FIG. 5 is a flowchart of one embodiment of a method for controlling virtual keyboards using the virtual keyboard control system.

FIG. 5 is a flowchart of one embodiment of a method for controlling virtual keyboards using the virtual keyboard control system 10. Depending on the embodiment, additional steps may be added, others removed, and the ordering of the steps may be changed.

Figure 2:
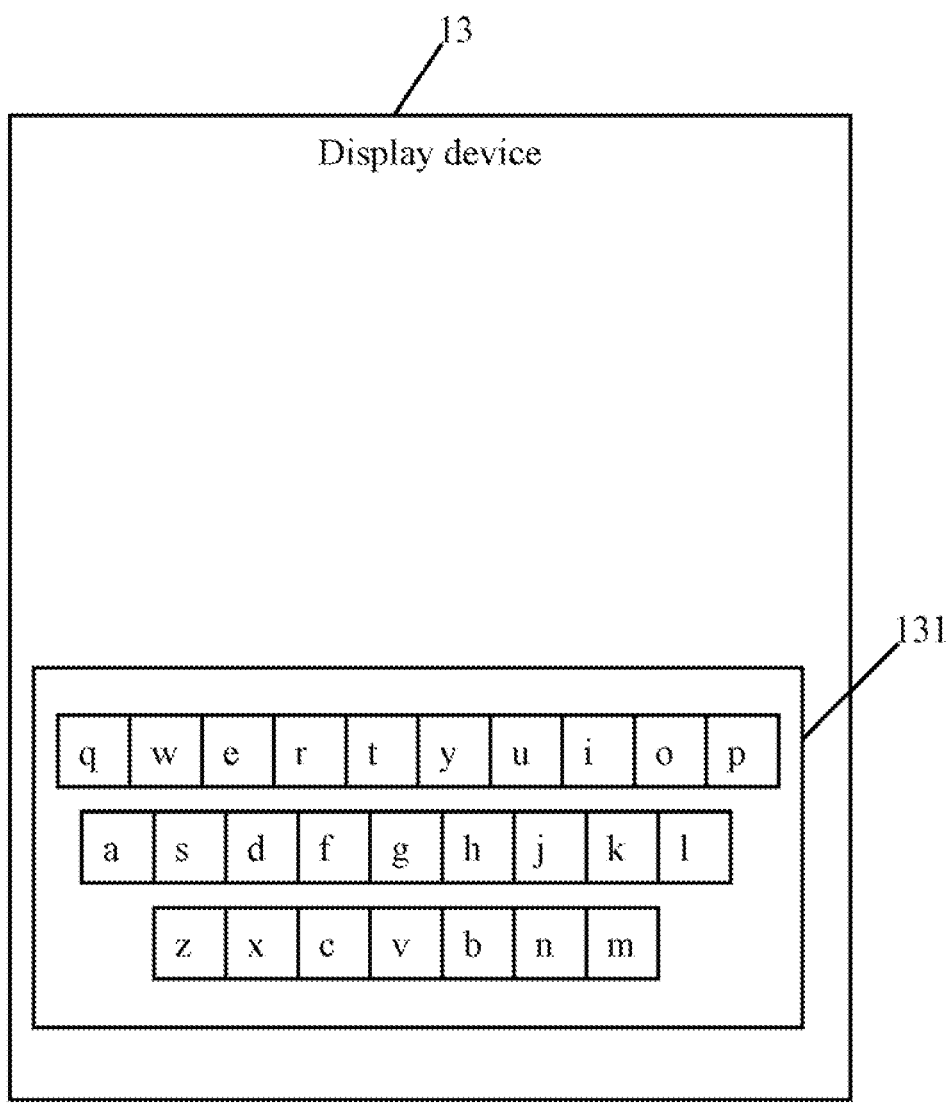
FIG. 2 is a schematic diagram of a first virtual keyboard provided by the virtual keyboard control system.

In step S2, the setting module 100 presets a first virtual keyboard, a second virtual keyboard, and a third virtual keyboard. The setting module 100 presets each key on the first virtual keyboard to correspond to an alphabetical letter, a numeral or a symbol. For example, FIG. 2 shows a first virtual keyboard 131 including a plurality of keys and each key on the first virtual keyboard 131 corresponding to an alphabetical letter. As another example, the first virtual keyboard may include the alphabetical letters, the numerals, and/or the symbols.

In a first embodiment, the setting module 100 integrates each two adjacent keys on the first virtual keyboard to be an integrated key, and displays two characters corresponding to the two adjacent keys on the integrated key. Then, based on a plurality of integrated keys, the setting module 100 presets the second virtual keyboard by highlighting a left character of the two characters on each integrated key, and presets the third virtual keyboard by highlighting a right character of the two characters on each integrated key.

When a key which cannot be integrated with other key remains, a remaining key is preset to be a single key on the second virtual keyboard or the third virtual keyboard, and a character corresponding to the remaining key is highlighted on both of the second virtual keyboard and the third virtual keyboard.

Figure 3:
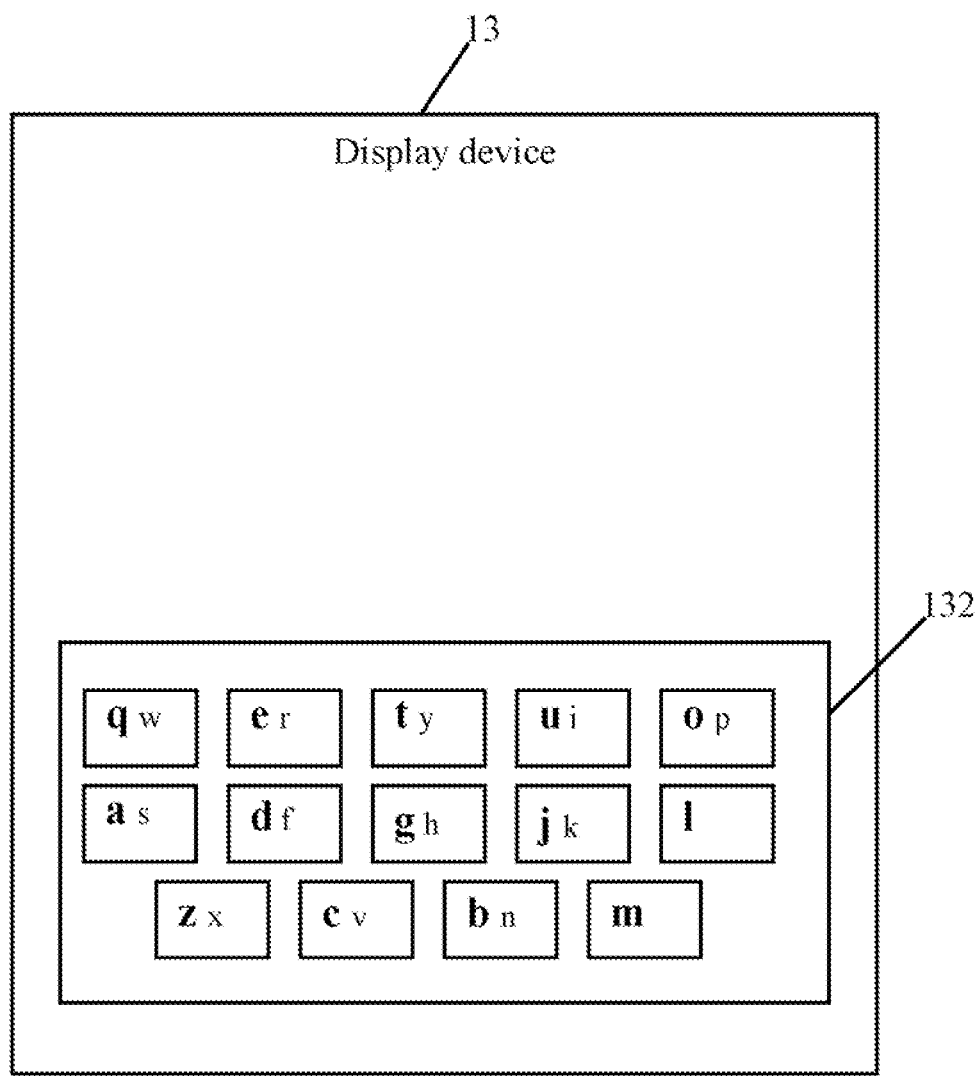
FIG. 3 is a schematic diagram of a second virtual keyboard provided by the virtual keyboard control system.
Figure 4:
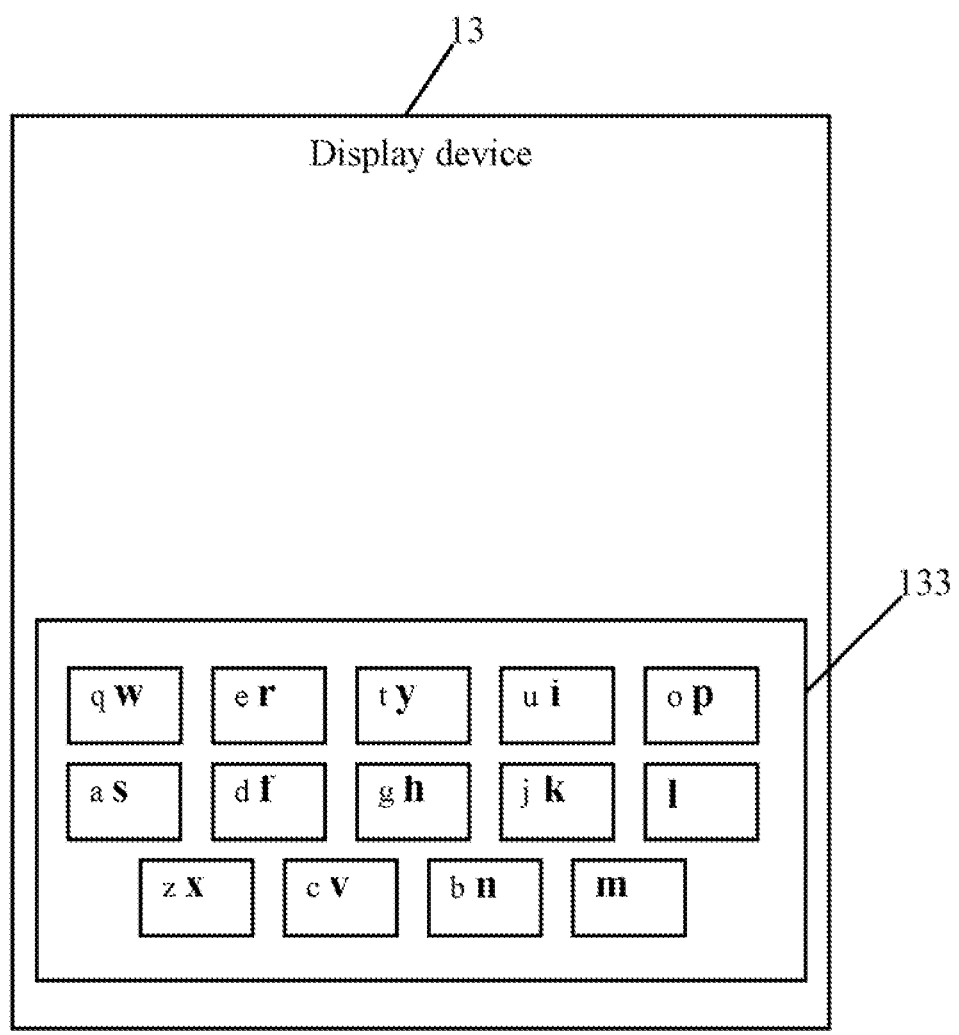
FIG. 4 is a schematic diagram of a third virtual keyboard provided by the virtual keyboard control system.

FIG. 3 shows a second virtual keyboard 132, and FIG. 4 shows a third virtual keyboard 133. Most keys on the second virtual keyboard 132 and the third virtual keyboard 133 include two characters, which correspond to two adjacent keys on the first virtual keyboard 131. Two remaining keys on the first virtual keyboard 131 cannot be integrated with an adjacent key, such as characters "l" and "m". Then two single keys corresponding to the characters "l" and "m" respectively are shown in FIG. 3 and FIG. 4, and the characters "l" and "m" are both highlighted on the second virtual keyboard 132 and the third virtual keyboard 133.

In other embodiments, the setting module 100 divides the keys on the first virtual keyboard into a left part and a right part, presets the left part of the first virtual keyboard to be the second virtual keyboard, and presets the right part of the first virtual keyboard to be the third virtual keyboard.

The arrangements of the keys and the characters corresponding to the keys, on the first virtual keyboard, the second virtual keyboard, and the third virtual keyboard, can be preset or modified according to user requirements. The setting module 100 may provide a setting user interface for a user of the electronic device 1 to arrange the keys or characters corresponding to the keys, to generate a plurality of customized virtual keyboards.

In step S4, the setting module 100 presets the first virtual keyboard to be a default virtual keyboard.

In step S6, the activating module 102 invokes the default virtual keyboard when the electronic device 1 enters a character input mode. For example, when the user inputs a message, adds an agenda item, the electronic device 1 enters the character input mode, and the default virtual keyboard is displayed on the display device 13.

In step S8, the determination module 104 detects a tilt direction and a tilt angle of the electronic device 1 using the angle detecting device 14.

In step S10, the determination module 104 determines whether the tilt angle is greater than a predetermined angle (e.g., 30°). When the tilt angle is greater than the predetermined angle, step S12 is implemented. When the tilt angle is less than or equal to the predetermined angle, the procedure returns to step S8.

In step S12, the determination module 104 determines whether the tilt direction is left or right. When the tilt direction is left, step S14 is implemented. When the tilt direction is right, step S16 is implemented. The determination module 104 may determines the tilt direction according to data acquired from the angle detecting device 14.

In step S14, the switch module 106 switches the default virtual keyboard to the second virtual keyboard when the tilt direction is left and the tilt angle is greater than the predetermined angle, and then the procedure goes to step S18.

In step S16, the switch module 106 switches the default virtual keyboard to the third virtual keyboard when the tilt direction is right and the tilt angle is greater than the predetermined angle, and then the procedure goes to step S18.

In step S18, the input module 108 detects a touch signal on the display device 13, determines coordinates of the touch signal, determines a clicked key on a current virtual keyboard according to the determined coordinates, and inputs a character corresponding to the clicked key on the current virtual keyboard.

For example, when the current virtual keyboard is the first virtual keyboard, the input module 108 inputs a character corresponding to the clicked key. When the current virtual keyboard is the second virtual keyboard, the input module 108 inputs a left character on the clicked key. When the current virtual keyboard is the third virtual keyboard, the input module 108 inputs a right character on the clicked key.

By utilizing the virtual keyboard control system 10, the user may switch the default virtual keyboard to the other virtual keyboards by shaking the electronic device 1 according to the predetermined angle.

It should be emphasized that the above-described embodiments of the present disclosure, particularly, any embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. A computer-implemented method for controlling virtual keyboards using an electronic device, the electronic device comprising an angle detecting device, the method comprising:

presetting a first virtual keyboard, a second virtual keyboard, and a third virtual keyboard, and presetting the first virtual keyboard to be a default virtual keyboard;

invoking the default virtual keyboard when the electronic device enters a character input mode;

detecting a tilt direction and a tilt angle of the electronic device using the angle detecting device; and switching the default virtual keyboard to the second virtual keyboard when the tilt direction is left and the tilt angle is greater than a predetermined angle; or switching the default virtual keyboard to the third virtual keyboard when the tilt direction is right and the tilt angle is greater than the predetermined angle.

2. The method according to claim 1, wherein keys on the first virtual keyboard comprise alphabetical letters, numerals or symbols, and the second virtual keyboard and the third virtual keyboard are preset by:

integrating each two adjacent keys on the first virtual keyboard to be an integrated key, and displaying two characters corresponding to the two adjacent keys on the integrated key;

presetting the second virtual keyboard based on a plurality of integrated keys by highlighting a left character of the two characters on each integrated key, and presetting the third virtual keyboard based on a plurality of integrated keys by highlighting a right character of the two characters on each integrated key.

3. The method according to claim 2, further comprising:

determining a remaining key on the first virtual keyboard, which cannot be integrated with other keys;

presetting the remaining key to be a single key on the second virtual keyboard or the third virtual keyboard; and highlighting a character corresponding to the remaining key on both of the second virtual keyboard and the third virtual keyboard.

4. The method according to claim 2, further comprising:

in response to detecting a touch signal, determining coordinates of the touch signal, and determining a clicked key on a current virtual keyboard according to the determined coordinates; and inputting a character corresponding to the clicked key on the current virtual keyboard.

5. The method according to claim 4, wherein the step of inputting a character corresponding to the clicked key on the current virtual keyboard comprises:

inputting a character corresponding to the clicked key when the current virtual keyboard is the first virtual keyboard; or inputting a left character on the clicked key when the current virtual keyboard is the second virtual keyboard; or inputting a right character on the clicked key when the current virtual keyboard is the third virtual keyboard.

6. The method according to claim 1, wherein the second virtual keyboard and the third virtual keyboard are preset by:
- dividing keys on the first virtual keyboard into a left part and a right part; and
- presetting the left part of the first virtual keyboard to be the second virtual keyboard, and presetting the right part of the first virtual keyboard to be the third virtual keyboard.

7. An electronic device, comprising:
- an angle detecting device;
- at least one processor; and
- a storage device storing a plurality of instructions, which when executed by the processor, causes the at least one processor to:
  - preset a first virtual keyboard, a second virtual keyboard, and a third virtual keyboard, and preset the first virtual keyboard to be a default virtual keyboard;
  - invoke the default virtual keyboard when the electronic device enters a character input mode;
  - detect a tilt direction and a tilt angle of the electronic device using the angle detecting device; and
  - switch the default virtual keyboard to the second virtual keyboard when the tilt direction is left and the tilt angle is greater than a predetermined angle; or
  - switch the default virtual keyboard to the third virtual keyboard when the tilt direction is right and the tilt angle is greater than the predetermined angle.

8. The electronic device according to claim 7, wherein keys on the first virtual keyboard comprise alphabetical letters, numerals or symbols, and the second virtual keyboard and the third virtual keyboard are preset by:
- integrating each two adjacent keys on the first virtual keyboard to be an integrated key, and displaying two characters corresponding to the two adjacent keys on the integrated key;
- presetting the second virtual keyboard based on a plurality of integrated keys by highlighting a left character of the two characters on each integrated key, and
- presetting the third virtual keyboard based on a plurality of integrated keys by highlighting a right character of the two characters on each integrated key.

9. The electronic device according to claim 8, wherein the at least one processor further:
- determines a remaining key on the first virtual keyboard, which cannot be integrated with other keys;
- presets the remaining key to be a single key on the second virtual keyboard or the third virtual keyboard; and
- highlights a character corresponding to the remaining key on both of the second virtual keyboard and the third virtual keyboard.

10. The electronic device according to claim 8, wherein the at least one processor further:
- in response to detecting a touch signal, determines coordinates of the touch signal, and determines a clicked key on a current virtual keyboard according to the determined coordinates; and
- inputs a character corresponding to the clicked key on the current virtual keyboard.

11. The electronic device according to claim 10, wherein the at least one processor inputs a character corresponding to the clicked key on the current virtual keyboard by:
- inputting a character corresponding to the clicked key when the current virtual keyboard is the first virtual keyboard; or
- inputting a left character on the clicked key when the current virtual keyboard is the second virtual keyboard; or
- inputting a right character on the clicked key when the current virtual keyboard is the third virtual keyboard.

12. The electronic device according to claim 7, wherein the second virtual keyboard and the third virtual keyboard are preset by:
- dividing keys on the first virtual keyboard into a left part and a right part; and
- presetting the left part of the first virtual keyboard to be the second virtual keyboard, and presetting the right part of the first virtual keyboard to be the third virtual keyboard.

13. A non-transitory storage medium having stored thereon instructions that, when executed by a processor of an electronic device, causes the electronic device to perform a method for unlock the electronic device, the electronic device comprising an angle detecting device, the method comprising:
- presetting a first virtual keyboard, a second virtual keyboard, and a third virtual keyboard, and presetting the first virtual keyboard to be a default virtual keyboard;
- invoking the default virtual keyboard when the electronic device enters a character input mode;
- detecting a tilt direction and a tilt angle of the electronic device using the angle detecting device; and
- switching the default virtual keyboard to the second virtual keyboard when the tilt direction is left and the tilt angle is greater than a predetermined angle; or
- switching the default virtual keyboard to the third virtual keyboard when the tilt direction is right and the tilt angle is greater than the predetermined angle.

14. The non-transitory storage medium according to claim 13, wherein keys on the first virtual keyboard comprise alphabetical letters, numerals or symbols, and the second virtual keyboard and the third virtual keyboard are preset by:
- integrating each two adjacent keys on the first virtual keyboard to be an integrated key, and displaying two characters corresponding to the two adjacent keys on the integrated key;
- presetting the second virtual keyboard based on a plurality of integrated keys by highlighting a left character of the two characters on each integrated key, and
- presetting the third virtual keyboard based on a plurality of integrated keys by highlighting a right character of the two characters on each integrated key.

15. The non-transitory storage medium according to claim 14, wherein the method further comprises:
- determining a remaining key on the first virtual keyboard, which cannot be integrated with other keys;
- presetting the remaining key to be a single key on the second virtual keyboard or the third virtual keyboard; and
- highlighting a character corresponding to the remaining key on both of the second virtual keyboard and the third virtual keyboard.

16. The non-transitory storage medium according to claim 14, wherein the method further comprises:
- in response to detecting a touch signal, determining coordinates of the touch signal, and determining a clicked key on a current virtual keyboard according to the determined coordinates; and
- inputting a character corresponding to the clicked key on the current virtual keyboard.

17. The non-transitory storage medium according to claim 16, wherein the step of inputting a character corresponding to the clicked key on the current virtual keyboard comprises:
- inputting a character corresponding to the clicked key when the current virtual keyboard is the first virtual keyboard; or inputting a left character on the clicked key when the current virtual keyboard is the second virtual keyboard; or inputting a right character on the clicked key when the current virtual keyboard is the third virtual keyboard.

18. The non-transitory storage medium according to claim 13, wherein the second virtual keyboard and the third virtual keyboard are preset by:

dividing keys on the first virtual keyboard into a left part and a right part; and presetting the left part of the first virtual keyboard to be the second virtual keyboard, and presetting the right part of the first virtual keyboard to be the third virtual keyboard.

\* \* \* \* \*